United States Patent
Kuwano et al.

(10) Patent No.: US 8,111,955 B2
(45) Date of Patent: Feb. 7, 2012

(54) OPTICAL CHIP FOR ARRAYED WAVEGUIDE GRATING TYPE OPTICAL MULTIPLEXER/DEMULTIPLEXER CIRCUIT, WAVEGUIDE SUBSTRATE, AND METHOD FOR FABRICATING OPTICAL CHIP FOR ARRAYED WAVEGUIDE GRATING TYPE OPTICAL MULTIPLEXER/DEMULTIPLEXER CIRCUIT

(75) Inventors: Shuji Kuwano, Tokyo (JP); Yuji Moriya, Tokyo (JP); Takamitsu Masuda, Tokyo (JP)

(73) Assignee: NTT Electronics Corporatioin, Tokyo (JP)

( * ) Notice: Subject to any disclaimer, the term of this patent is extended or adjusted under 35 U.S.C. 154(b) by 326 days.

(21) Appl. No.: 12/438,780

(22) PCT Filed: Aug. 30, 2007

(86) PCT No.: PCT/JP2007/066851
§ 371 (c)(1),
(2), (4) Date: Feb. 25, 2009

(87) PCT Pub. No.: WO2008/032579
PCT Pub. Date: Mar. 20, 2008

(65) Prior Publication Data
US 2010/0008626 A1 Jan. 14, 2010

(30) Foreign Application Priority Data
Sep. 13, 2006 (JP) .................................. 2006-247695

(51) Int. Cl.
G02B 6/12 (2006.01)

(52) U.S. Cl. ............. 385/14; 385/46; 385/129; 385/132

(58) Field of Classification Search .................. None
See application file for complete search history.

(56) References Cited

U.S. PATENT DOCUMENTS

| 5,926,586 A | 7/1999 | Dragone et al. |
| 2002/0113242 A1 | 8/2002 | Watanabe et al. |
| 2003/0156789 A1 | 8/2003 | Bhardwaj et al. |
| 2008/0080806 A1* | 4/2008 | Ho et al. .......................... 385/14 |
| 2011/0008002 A1* | 1/2011 | Hasegawa et al. .............. 385/37 |

FOREIGN PATENT DOCUMENTS

| CN | 1551832 A | 12/2004 |
| JP | 2002-250826 | 9/2002 |

OTHER PUBLICATIONS

Chinese Office Action dated Jun. 11, 2010 for corresponding Chinese Patent Application No. 200780033866.0 (with English translation).

* cited by examiner

*Primary Examiner* — Mike Stahl
(74) *Attorney, Agent, or Firm* — Ohlandt, Greeley, Ruggiero & Perle, L.L.P.

(57) ABSTRACT

An optical chip according to the present invention is formed into a projecting shape expanded toward either side at the center. A waveguide substrate has a layout in which arrayed waveguide grating type optical multiplexer/demultiplexer circuits, each having a curve direction of an array waveguide reverse to each other, are arranged in combination, and the optical chips are cut out of the waveguide substrate. A method for fabricating the optical chip according to the present invention can enhance an optical chip yield rate, and further, can fabricate an optical chip having the shape for stabilizing optical characteristics of the arrayed waveguide grating type optical multiplexer/demultiplexer circuit.

4 Claims, 10 Drawing Sheets

OPTICAL CHIP FOR ARRAYED WAVEGUIDE GRATING TYPE OPTICAL MULTIPLEXER/DEMULTIPLEXER CIRCUIT, WAVEGUIDE SUBSTRATE, AND METHOD FOR FABRICATING OPTICAL CHIP FOR ARRAYED WAVEGUIDE GRATING TYPE OPTICAL MULTIPLEXER/DEMULTIPLEXER CIRCUIT

CROSS REFERENCE TO RELATED APPLICATION

This is a U.S. national phase application under 35 U.S.C. §371 of International Patent Application No. PCT/JP2007/066851 filed Aug. 30, 2007 and claims the benefit of Japanese Application No. JP2006-247695, filed Sep. 13, 2006. The International Application was published on Mar. 20, 2008 as International Publication No. WO/2008/032579 under PCT Article 21(2) the content of both applications are incorporated herein in their entirety.

TECHNICAL FIELD

The present invention relates to an optical chip including an arrayed waveguide grating type optical multiplexer/demultiplexer circuit, a waveguide substrate having a plurality of patterns for an arrayed waveguide grating type optical multiplexer/demultiplexer circuit formed thereon, and a method for fabricating an optical chip including an arrayed waveguide grating type optical multiplexer/demultiplexer circuit.

BACKGROUND OF THE INVENTION

An arrayed waveguide grating type optical multiplexer/demultiplexer circuit can multiplex or demultiplex optical signals having different wavelengths, and therefore, it is used as an optical multiplexer or an optical demultiplexer for wavelength division multiplexing communications which enables transmission of a large amount of information. In order to miniaturize or mass-produce the arrayed waveguide grating type optical multiplexer/demultiplexer circuit, an input/output waveguide, a slab waveguide, and an array waveguide as constituent parts of the arrayed waveguide grating type optical multiplexer/demultiplexer circuit are formed on a waveguide substrate such as a silicon wafer, which is then cut out into optical chips including the arrayed waveguide grating type optical multiplexer/demultiplexer circuit.

Figure 9:
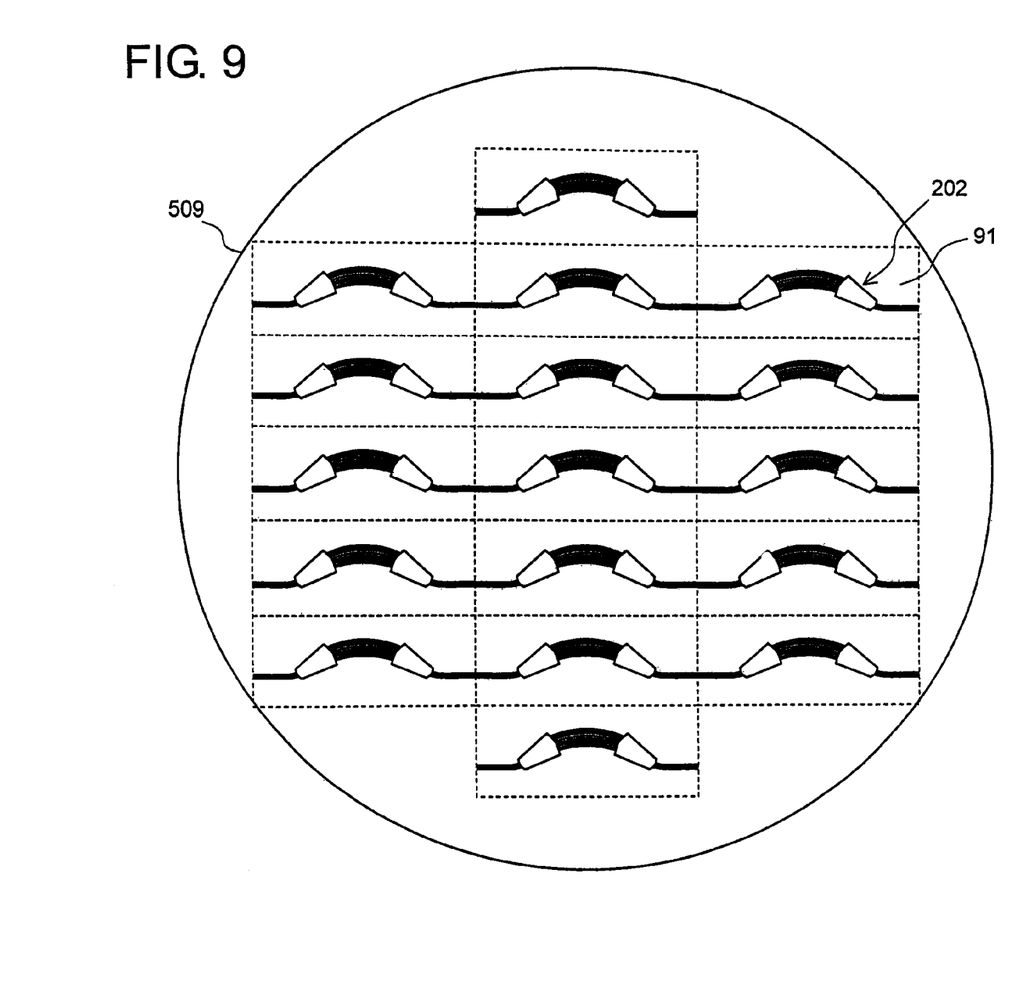
FIG. 9 is a diagram illustrating a silicon wafer 509 in a conventional layout in which AWGs 202 are arranged.

In fabricating an arrayed waveguide grating type optical multiplexer/demultiplexer circuit in the prior art, rectangular regions 91 are frequently arranged on a circular silicon wafer 509, and then, an arrayed waveguide grating type optical multiplexer/demultiplexer circuit 202 is formed in the region, as illustrated in FIG. 9. This is because optical chips can be readily cut out from the rectangular region by a dicing saw. However, the arrayed waveguide grating type optical multiplexer/demultiplexer circuit has many curved portions, and therefore, many regions which cannot be effectively used remain within the rectangular optical chip. In this manner, the number of optical chips per waveguide substrate, that is, an optical chip yield rate is reduced, resulting in an increase in unit price of the optical chip.

Figure 10:
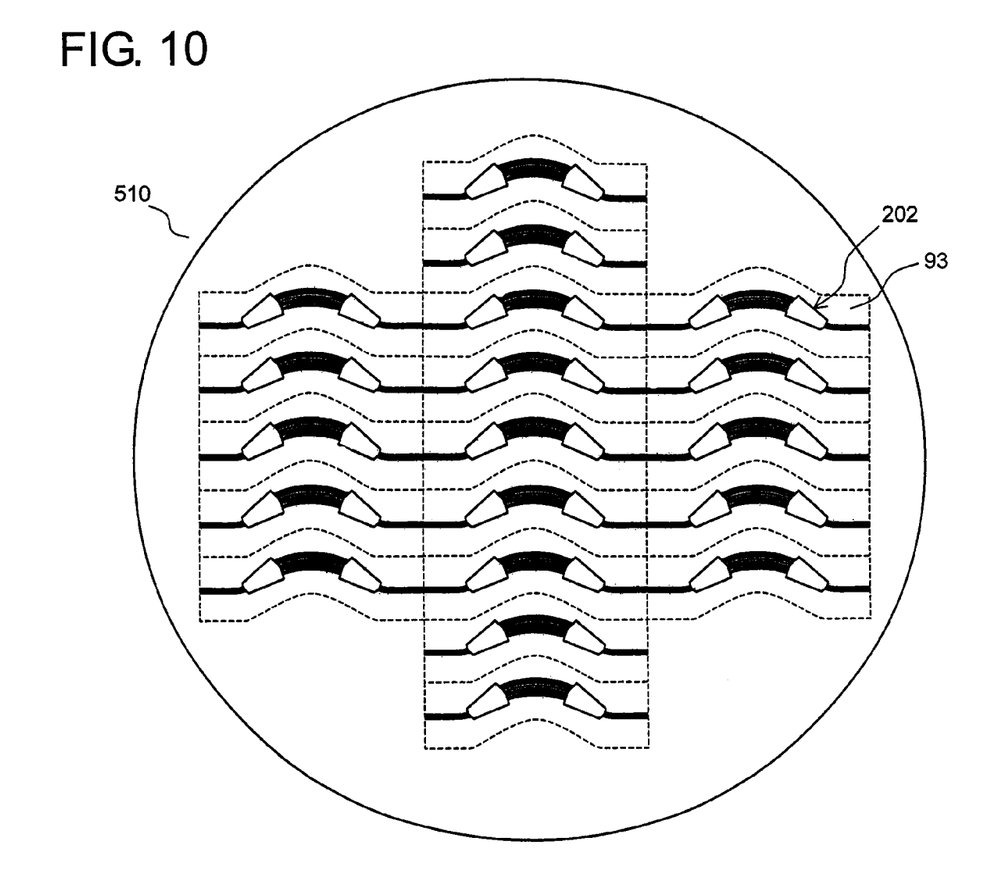
FIG. 10 is a diagram illustrating a silicon wafer 510 in another conventional layout in which the AWGs 202 are arranged.

On the other hand, Japanese Patent Application Laid-open No. 2002-250826 ("JP '826") discloses an arcuate optical chip. As illustrated in FIG. 10, it is disclosed that arcuate regions 93 are arranged on a silicon wafer 510, and then, an arrayed waveguide grating type optical multiplexer/demultiplexer circuit 202 is formed in the region. More arrayed waveguide grating type optical multiplexer/demultiplexer circuits can be formed in the arcuate regions on the silicon wafer than in the rectangular regions, thereby increasing an optical chip yield rate.

SUMMARY OF INVENTION

However, when the optical chip is formed into an arcuate shape, as disclosed in JP '826, a physical stress by optical fibers connected to input/output waveguides disposed at both ends is concentrated on an array waveguide arranged at the center, thereby deforming the optical chip, so as to induce fluctuations in optical characteristics. As a consequence, the optical chip for the conventional arrayed waveguide grating type optical multiplexer/demultiplexer circuit has involved a problem of the optical chip yield rate in the case of the rectangular shape whereas a problem of the stability of the optical characteristics in the case of the arcuate shape.

In view of this, in order to solve the above-described problems, an object of a first invention of the present application is to provide an optical chip for an arrayed waveguide grating type optical multiplexer/demultiplexer circuit in which an optical chip yield rate can be enhanced and stable optical characteristics can be achieved. Furthermore, in order to solve the above-described problems, an object of a second invention of the present application is to provide a waveguide substrate in which a plurality of patterns for an arrayed waveguide grating type optical multiplexer/demultiplexer circuit can be formed in a layout for enhancing an optical chip yield rate, and an optical chip can be formed into a shape for stabilizing optical characteristics of the arrayed waveguide grating type optical multiplexer/demultiplexer circuit. Moreover, in order to solve the above-described problems, an object of a third invention of the present application is to provide a method for fabricating an optical chip for an arrayed waveguide grating type optical multiplexer/demultiplexer circuit which is high in optical chip yield rate and stable in optical characteristics.

In order to achieve the above-described objects, an optical chip for an arrayed waveguide grating type optical multiplexer/demultiplexer circuit according to an embodiment of the present application is formed into a projecting shape expanded toward either side at the center.

Specifically, an invention of the present application is directed to an optical chip for an arrayed waveguide grating type optical multiplexer/demultiplexer circuit including: two slab waveguides; an array waveguide for connecting the slab waveguides via a plurality of channel waveguides different in optical path length and curved in one direction; and at least one or more input/output waveguides connected to the slab waveguides, respectively, on sides opposite to the array waveguide, wherein one edge is formed into a shape projecting outward of a curve of the array waveguide by connecting a first line of two fold rotational symmetry and a second line of two fold rotational symmetry whereas another edge facing the one edge is straight, and input/output ends, at which the input/output waveguides disposed at both ends appear, are equal in width to each other.

The optical chip is formed into the projecting shape, so that a physical strength at the center is great. As a consequence, even if a physical stress by optical fibers connected to input/output waveguides disposed at both ends is concentrated on the array waveguide arranged at the center, the shape of the optical chip is hardly deformed. Thus, the stable optical characteristics can be achieved in the optical chip for the arrayed waveguide grating type optical multiplexer/demultiplexer circuit.

In addition, the one edge defining the projecting shape of the optical chip is formed into a shape defined by connecting the first line of the two fold rotational symmetry and the second line of the two fold rotational symmetry. Here, the two fold rotational symmetry signifies a property in which the shape cannot be changed despite of rotational movement at 180° on a rotational axis (i.e., a rotational axis of two fold rotational symmetry). The two optical chips are arranged in such a manner that the ends, at which the input/output waveguides appear, fit with each other, thereby forming a recess held between the expanded portions (i.e., the projections) at the respective one edges. When a projection of another optical chip rotated at 180° is fitted to the recess, the projection of the optical chip rotated at 180° is fitted to the recess since the one edge of the optical chip is formed into the shape defined by connecting the first line and the second line. In other words, the not-rotated optical chips and the optical chip rotated at 180° are combined with each other, so that the optical chips can be arranged without any gap. As a consequence, a region on the waveguide substrate, which cannot be effectively utilized, can be reduced in the case where the optical chips are arranged on the waveguide substrate, thus increasing the number of arrayed waveguide grating type optical multiplexer/demultiplexer circuits which can be arranged on the waveguide substrate.

Thus, according to this invention of the present application, it is possible to provide the optical chip for the arrayed waveguide grating type optical multiplexer/demultiplexer circuit in which the optical chip yield rate can be enhanced and the stable optical characteristics can be achieved.

The array waveguide in the optical chip for the arrayed waveguide grating type optical multiplexer/demultiplexer circuit according to the first invention of the present application further may include a straight channel waveguide having an optical path length shorter than those of the curved channel waveguides inward of the curves of the curved channel waveguides.

Since the other edge of the optical chip is straight, the straight channel waveguide can be added inward of the curve of the channel waveguide. As a consequence, the region inward of the curve of the channel waveguide can be effectively utilized, thus improving the multiplexer/demultiplexer characteristics without varying the size of the optical chip.

Thus, according to an invention of the present application, it is possible to provide the optical chip for the arrayed waveguide grating type optical multiplexer/demultiplexer circuit in which the optical chip yield rate can be enhanced and the stable optical characteristics can be achieved.

In order to achieve the above-described objects, the second invention of the present application provides a waveguide substrate in which patterns for arrayed waveguide grating type optical multiplexer/demultiplexer circuits whose curve directions of the array waveguides are reverse to each other are arranged in combination.

Specifically, another embodiment of the present application is directed to a waveguide substrate having a plurality of patterns for arrayed waveguide grating type optical multiplexer/demultiplexer circuits formed thereon including: two slab waveguides; an array waveguide for connecting the slab waveguides via a plurality of channel waveguides different in optical path length and curved in one direction; and at least one or more input/output waveguides connected to the slab waveguides, respectively, on sides opposite to the array waveguide, wherein the plurality of patterns for the arrayed waveguide grating type optical multiplexer/demultiplexer circuits are arranged in a layout in which a plurality of forward directions, on which the array waveguides are aligned in a curve direction and the patterns are aligned on one line in a direction perpendicular to the curve direction of the array waveguide, and a plurality of reverse directions, on which the curve direction of the array waveguide is aligned in a direction reverse to the curve direction of the array waveguide on the forward direction and the patterns are aligned on one line in the direction perpendicular to the curve direction of the array waveguide, are alternately arranged in such a manner that a center line vertically traversing between the slab waveguides on the side of the array waveguide on the forward direction traverses between the slab waveguides on the side of the input/output waveguide on the reverse direction.

With the above-described layout, the forward direction and the reverse direction are made to approach each other, thereby reducing the region on the waveguide substrate, which cannot be effectively utilized, so as to form the more patterns for the arrayed waveguide grating type optical multiplexer/demultiplexer circuit on the waveguide substrate. Moreover, the optical chip is formed into the shape according to an embodiment of the present application by cutting the waveguide substrate between the forward direction and the reverse direction in such a manner as not to meet the arrayed waveguide grating type optical multiplexer/demultiplexer circuit. Consequently, even if the physical stress is concentrated on the array waveguide arranged at the center, the chip is hardly deformed, thus achieving the optical chip for the arrayed waveguide grating type optical multiplexer/demultiplexer circuit having the stable optical characteristics.

As a consequence, according to the present application, it is possible to provide the waveguide substrate in which the plurality of patterns for the arrayed waveguide grating type optical multiplexer/demultiplexer circuit can be formed in the layout for enhancing the optical chip yield rate and the optical chip can be formed into the shape for stabilizing the optical characteristics of the arrayed waveguide grating type optical multiplexer/demultiplexer circuit.

According to an embodiment of the present application, in the layout, the forward direction may be arranged in the space on the side of the curve of the array waveguide out of the spaces of the forward directions and the reverse directions in such a manner that a top of an outermost channel waveguide in the array waveguide included in the forward direction is located on the side of the input/output waveguide included in the reverse direction nearer than a line connecting tops of outermost channel waveguides in the array waveguide included in the reverse direction.

The forward direction and the reverse direction are made to approach each other, thereby reducing the region on the waveguide substrate, which cannot be effectively utilized, so as to form the more patterns for the arrayed waveguide grating type optical multiplexer/demultiplexer circuit on the waveguide substrate.

As a consequence, it is possible to provide the waveguide substrate in which the plurality of patterns for the arrayed waveguide grating type optical multiplexer/demultiplexer circuit can be formed in the layout for enhancing the optical chip yield rate and the optical chip can be formed into the shape for stabilizing optical characteristics of the arrayed waveguide grating type optical multiplexer/demultiplexer circuit.

In order to achieve the above-described objects, a further embodiment of the present application is directed to provide a method for fabricating the optical chip according to an embodiment of the present application by forming the waveguide substrate according to another embodiment of the present application and cutting the waveguide substrate between the forward direction and the reverse direction in such a manner as not to meet the array waveguide.

Specifically, according to a further embodiment of the present application, a method for fabricating an optical chip for an arrayed waveguide grating type optical multiplexer/demultiplexer circuit includes: a circuit forming process for forming a waveguide substrate having the plurality of patterns for the arrayed waveguide grating type optical multiplexer/demultiplexer circuit formed thereon according to the second invention of the present application; a first cutting process for, after the circuit forming process, cutting the waveguide substrate in a line space on a side of a curve of the array waveguide out of line spaces defined between forward directions and reverse directions along a cut line consisting of a first line of two fold rotational symmetry and a second line of two fold rotational symmetry alternately connected to each other and out of contact with the arrayed waveguide grating type optical multiplexer/demultiplexer circuit while straight cutting the waveguide substrate in a line space on a side opposite to the curve of the array waveguide out of the line spaces defined between the forward directions and the reverse directions; and a second cutting process for cutting the forward directions and the reverse directions cut in the first cutting process in conformity with the patterns, to cut out the optical chip for the arrayed waveguide grating type optical multiplexer/demultiplexer circuit according to the present application.

In the circuit forming process, the arrayed waveguide grating type optical multiplexer/demultiplexer circuit is formed on the waveguide substrate in the layout according to the present invention, thereby increasing the number of arrayed waveguide grating type optical multiplexer/demultiplexer circuits per waveguide substrate. Moreover, the optical chip for the arrayed waveguide grating type optical multiplexer/demultiplexer circuit cut out of the waveguide substrate in the first cutting process and the second cutting process is formed into the projecting shape according to an embodiment of the present application. As a consequence, even if the physical stress from the outside is concentrated on the array waveguide arranged at the center, the optical chip is hardly deformed. Thus, many optical chips for the arrayed waveguide grating type optical multiplexer/demultiplexer circuit having the stable optical characteristics can be fabricated out of the waveguide substrate by the fabricating method.

Thus, according to a further embodiment of the present application, it is possible to provide the method for fabricating the optical chip for the arrayed waveguide grating type optical multiplexer/demultiplexer circuit which is high in optical chip yield rate and stable in optical characteristics.

Thus, according to an embodiment of the present application, it is possible to provide the optical chip for the arrayed waveguide grating type optical multiplexer/demultiplexer circuit in which the optical chip can be formed into the shape for enhancing the optical chip yield rate and the stable optical characteristics can be achieved. Furthermore, according to another embodiment of the present application, it is possible to provide the waveguide substrate in which the plurality of patterns for the arrayed waveguide grating type optical multiplexer/demultiplexer circuit can be formed in the layout for enhancing the optical chip yield rate and the optical chip can be formed into the shape for stabilizing the optical characteristics of the arrayed waveguide grating type optical multiplexer/demultiplexer circuit. Moreover, according to the present application, it is possible to provide the method for fabricating the optical chip for the arrayed waveguide grating type optical multiplexer/demultiplexer circuit which is high in optical chip yield rate and stable in optical characteristics.

DETAILED DESCRIPTION OF THE INVENTION

Embodiments according to the present invention will be described in reference to the attached drawings. The embodiments described below exemplify the present invention, which, therefore, is not limited to the following embodiments.

(Optical Chip for Arrayed Waveguide Grating Type Optical Multiplexer/Demultiplexer Circuit)

The present embodiment is directed to an optical chip for an arrayed waveguide grating type optical multiplexer/demultiplexer circuit including two slab waveguides, an array waveguide for connecting the slab waveguides via a plurality of channel waveguides different in optical path length and curved in one direction, and at least one or more input/output waveguides connected to the slab waveguides, respectively, on sides opposite to the array waveguide, wherein one edge is formed into a shape projecting outward of a curve of the array waveguide by connecting a first line of two fold rotational symmetry and a second line of two fold rotational symmetry whereas another edge facing the one edge is straight, and input/output ends, at which the input/output waveguides disposed at both ends appear, are equal in width to each other.

Figure 1:
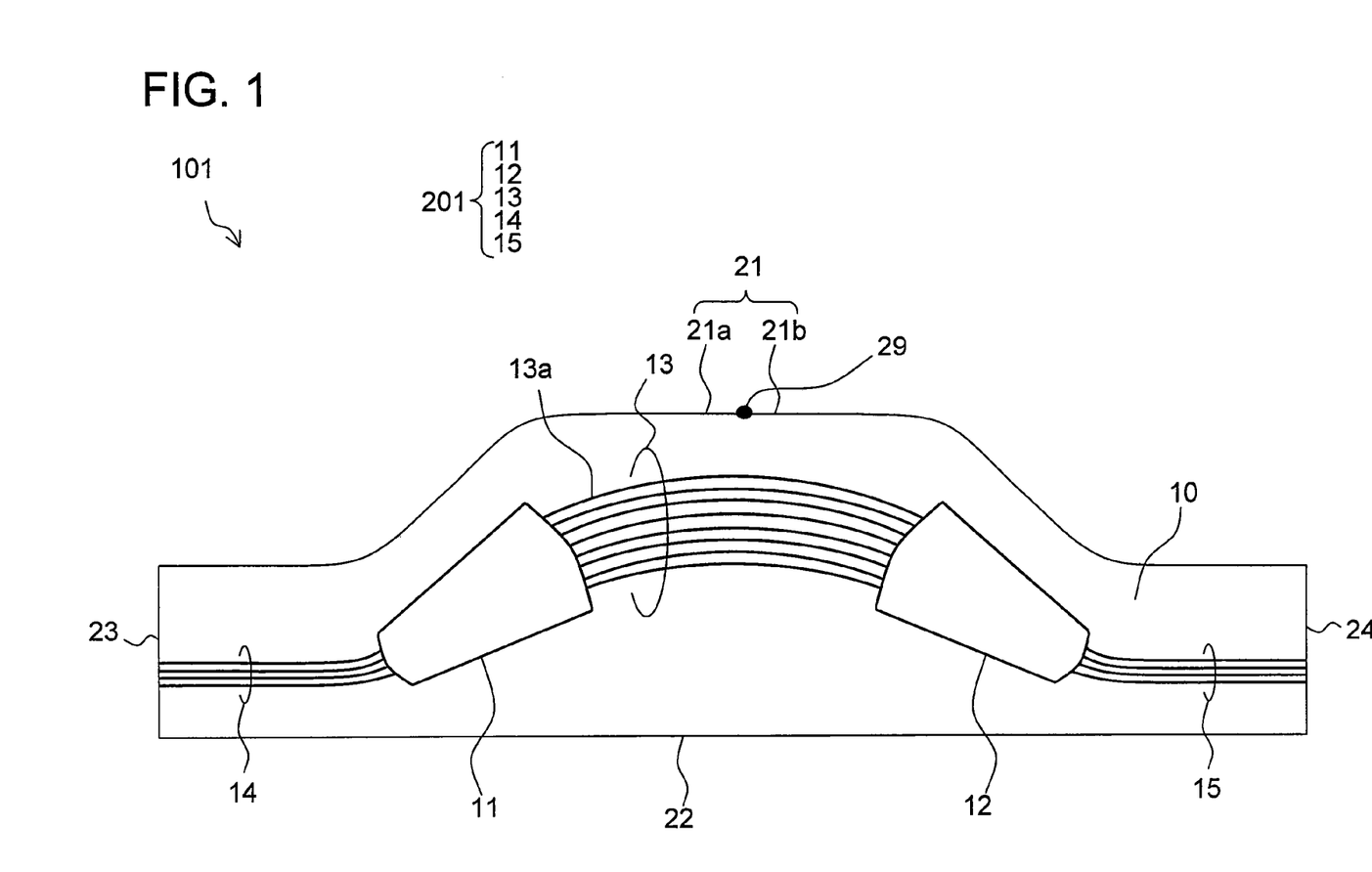
FIG. 1 is a diagram illustrating the configuration of an optical chip 101 in an embodiment according to the present application.

FIG. 1 is a diagram illustrating the configuration of an optical chip 101 exemplifying an embodiment of the present application. The optical chip 101 includes a substrate 10, a slab waveguide 11, slab waveguide 12, an array waveguide 13, an input/output waveguide 14, input/output waveguide 15, one edge 21, another edge 22, an input/output end 23, and input/output end 24.

The substrate 10 is constituted by forming a quartz thin layer on a projecting silicon plate or a projecting glass plate. The substrate 10 is surrounded by the one edge 21, another edge 22, the input/output end 23, and the input/output end 24. The one edge 21 and another edge 22 are facing each other.

Here, a width of an optical chip signifies a distance between the one edge 21 and another edge 22.

The one edge 21 consists of a first line 21a of two fold rotational symmetry and a second line 21b of two fold rotational symmetry, which are connected on a connection point 29 to each other. The one edge 21 is formed into a shape partly expanded in a width direction. In FIG. 1, the first line 21a and the second line 21b are curves, but they may be straight lines or bent straight lines. Another edge 22 is straight. Both longitudinal ends of the substrate 10 are referred to as the input/output end 23 and the input/output end 24. The optical chip at the input/output end 23 and the optical chip at the input/output end 24 are equal in width to each other. Here, the connection point 29 is indicated for the sake of the description, but does not actually exist.

The slab waveguide 11 and the slab waveguide 12 have the function of multiplexing input optical signals with each other, and further, of equally distributing the multiplexed optical signal into a plurality of signals, so as to output them. FIG. 1 illustrates the slab waveguide which can multiplex four inputs with each other so as to distribute them into eight outputs or which can multiplex eight inputs with each other so as to distribute them into four outputs. Here, the number of signals to be input or output is not limited to the above example.

The array waveguide 13 is constituted of a plurality of channel waveguides 13a. The channel waveguide 13a has a structure in which a material having a great index of refraction is surrounded by a material having a small index of refraction, and fully reflects the optical signal inside of the material having a great index of refraction to propagate it. The channel waveguides 13a are curved in one direction in such a manner as to have different optical path lengths. In FIG. 1, the array waveguide 13 is constituted of the eight channel waveguides 13a. Here, the number of channel waveguides 13a is not limited to this.

The input/output waveguide 14 and the input/output waveguide 15 propagate optical signals, like the channel waveguides 13a. In FIG. 1, the input/output waveguides 14 and the input/output waveguides 15 are provided in four, respectively, but the number of input/output waveguides is not limited to this.

On the substrate 10 are formed the slab waveguide 11, the slab waveguide 12, the array waveguide 13, the input/output waveguide 14, and the input/output waveguide 15. The array waveguide 13 is formed at a wide portion of the substrate 10. The one edge 21 is expanded in the direction of the curves of the channel waveguides 13a. The array waveguide 13 connects the slab waveguide 11 and the slab waveguide 12 to each other, and further, the input/output waveguide 14 is connected to the slab waveguide 11 on a side opposite to the array waveguide 13 whereas the input/output waveguide 15 is connected to the slab waveguide 12 on a side opposite to the array waveguide 13, thus constituting an arrayed waveguide grating type optical multiplexer/demultiplexer circuit 201 (hereinafter abbreviating "an arrayed waveguide grating type optical multiplexer/demultiplexer circuit" as "an AWG").

One end of the input/output waveguide 14 appears at the input/output end 23 whereas one end of the input/output waveguide 15 appears at the input/output end 24. An optical signal is input into the AWG 201 from the outside of the optical chip 101, and then, an optical signal is output from the AWG 201 to the outside of the optical chip.

The AWG 201 is operated as follows. In the case where, for example, an optical signal is input from the input/output end 23, the optical signal is propagated through the input/output waveguide 14, to be thus input into the slab waveguide 11. In the slab waveguide 11, the input optical signals are multiplexed together, and then, are equally distributed to be coupled at each of the channel waveguides 13a in the array waveguide 13. The optical signals propagated through the array waveguide 13 are coupled together at the slab waveguide 12. Since the channel waveguides 13a are different in optical path length from each other, the optical signals output from each the channel waveguides 13a interfere with each other inside of the slab waveguide 12, so that a selected wavelength is coupled to the input/output waveguide 15. As a consequence, the optical signals demultiplexed per wavelength are output from the input/output waveguide 15 of the input/output end 24.

To the input/output end 23 and the input/output end 24 is connected an optical fiber for inputting the optical signal into the AWG 201 or an optical fiber for multiplexing the optical signal from the AWG 201. Here, since the optical chip 101 is wide near the array waveguide 13, a physical stress in the case of the connection of the optical fiber is dispersed, and therefore, the optical chip 101 is hardly deformed. As a result, the array waveguide 13 also is hardly deformed, thus stabilizing optical characteristics of the AWG 201. Consequently, it is unnecessary to independently prepare any auxiliary plate for reinforcing substrate stress durability, thereby reducing the number of component parts.

Figure 2:
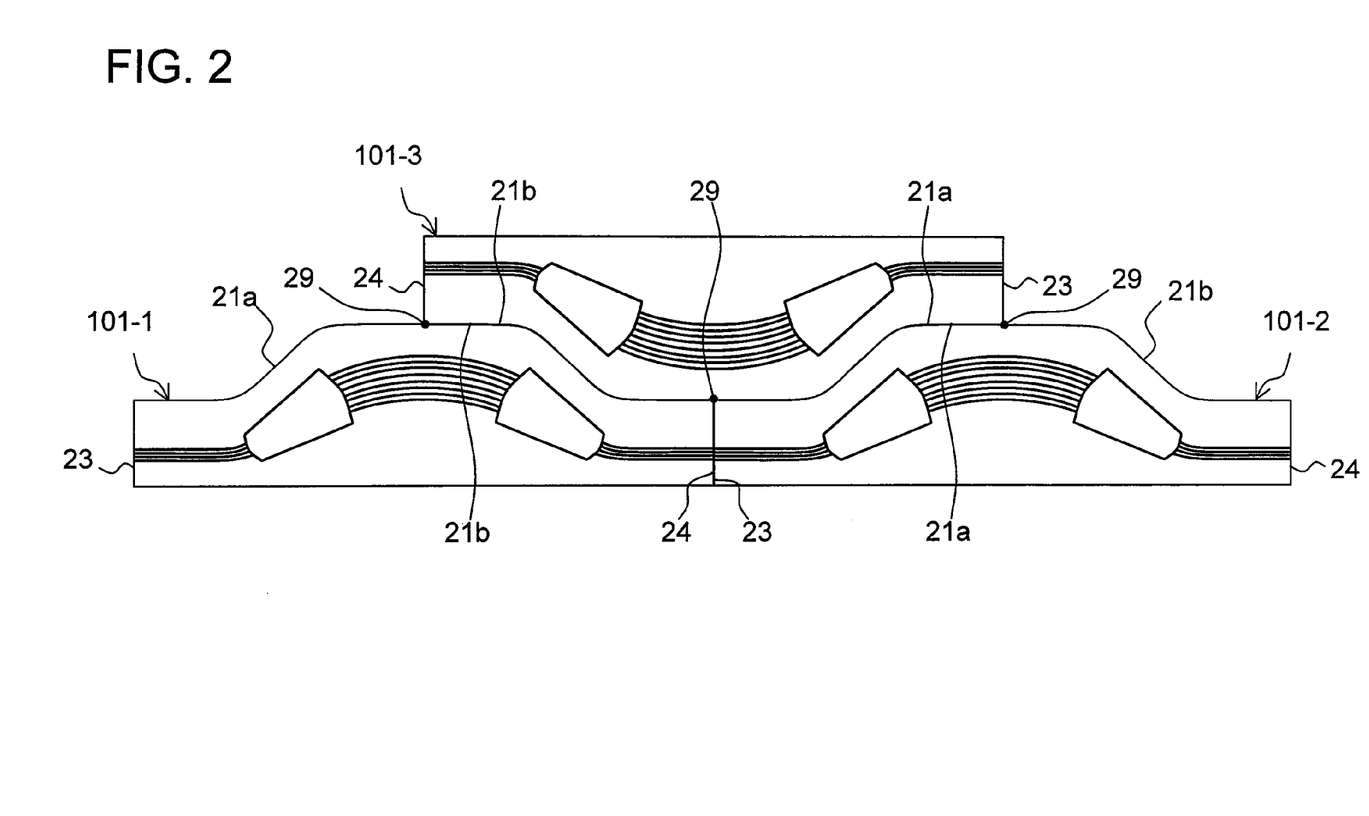
FIG. 2 is a diagram illustrating the arrangement of three optical chips 101.

A plurality of optical chips 101 can be arranged without any gap in combination with optical chips 101 rotated at 180°. FIG. 2 illustrates the arrangement of three optical chips 101. In FIG. 2, the same reference numerals as those used in FIG. 1 designate the same component parts or portions as those illustrated in FIG. 1. For the sake of explanation, the optical chips 101 are attached with branch numbers 1 to 3, and they all are identical to the optical chip 101 described in reference to FIG. 1.

In FIG. 2, two optical chips 101-1 and 101-2 are arranged in parallel to each other. The input/output end 24 of the optical chip 101-1 is brought into contact with the input/output end 23 of the optical chip 101-2. Since the width of the optical chip 101-1 at the input/output end 24 is equal to that of the optical chip 101-2 at the input/output end 23, the second line 21b of the optical chip 101-1 and the first line 21a of the optical chip 101-2 define a recess. To the recess is fitted another optical chip 101-3 rotated at 180°. Specifically, the second line 21b of the optical chip 101-3 is brought into contact with the second line 21b of the optical chip 101-1 whereas the first line 21a of the optical chip 101-3 is brought into contact with the first line 21a of the optical chip 101-2.

Since the first line 21a and the second line 21b establish the relationship of two fold rotational symmetry, the second line 21b of the optical chip 101-1 accords with the second line 21b of the optical chip 101-3. Similarly, the first line 21a of the optical chip 101-2 accords with the first line 21a of the optical chip 101-3. As a consequence, the optical chip 101 is combined with the other optical chip 101 rotated at 180°, so that the optical chips 101 can be arranged without any gap.

Figure 7:
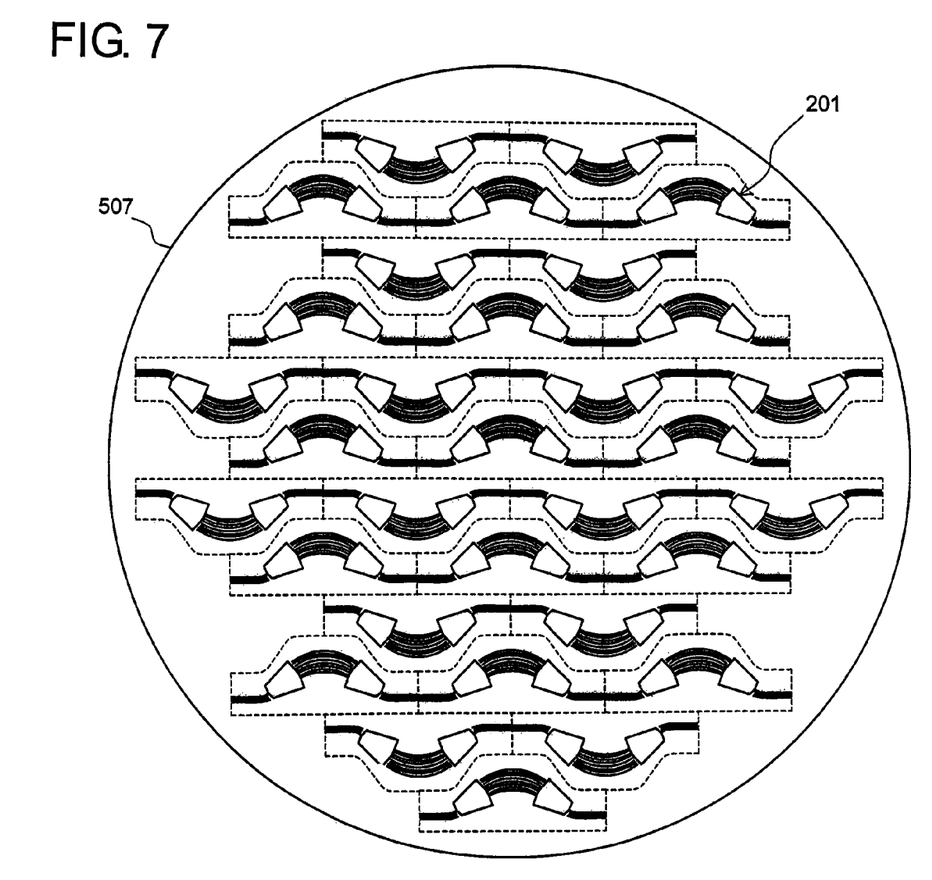
FIG. 7 is a diagram illustrating a silicon wafer 507 having the plurality of AWGs 201 arranged thereon. Broken lines indicate cut lines. The optical chips 101 can be cut out along the cutting lines, and therefore, the cutting lines indicate also a layout of the arrangement of the optical chips 101.

FIG. 7 illustrates a silicon wafer 507 serving as a waveguide substrate, on which the plurality of AWGs 201 is arranged. The same reference numerals in FIG. 7 as those used in FIG. 1 designate the same component parts or portions. In addition, broken lines indicate cut lines along which the optical chips are cut out of the waveguide substrate. In FIG. 7, the broken line shows an outline of the optical chip 101 (i.e., the one edge 21, another edge 22, the input/output end 23, and the input/output end 24). As described in reference to FIG. 2, the optical chips 101 can be arranged without any gap, and therefore, a region on the silicon wafer 507 can be effectively utilized, thereby increasing the number of AWGs 201 to be formed on the silicon wafer 507.

In this manner, the yield rate of the optical chip 101 can be enhanced, and further, the optical characteristics of the AWG 201 can be stabilized. Incidentally, the broken lines drawn in the silicon wafer 507 may disappear according to a method for fabricating the optical chip.

(Another Example of Optical Chip for AWG)

In the present embodiment, the array waveguide for the AWG further includes a straight channel waveguide having an optical path length shorter than those of the curved channel waveguides inward of the curves of the curved channel waveguides.

Figure 3:
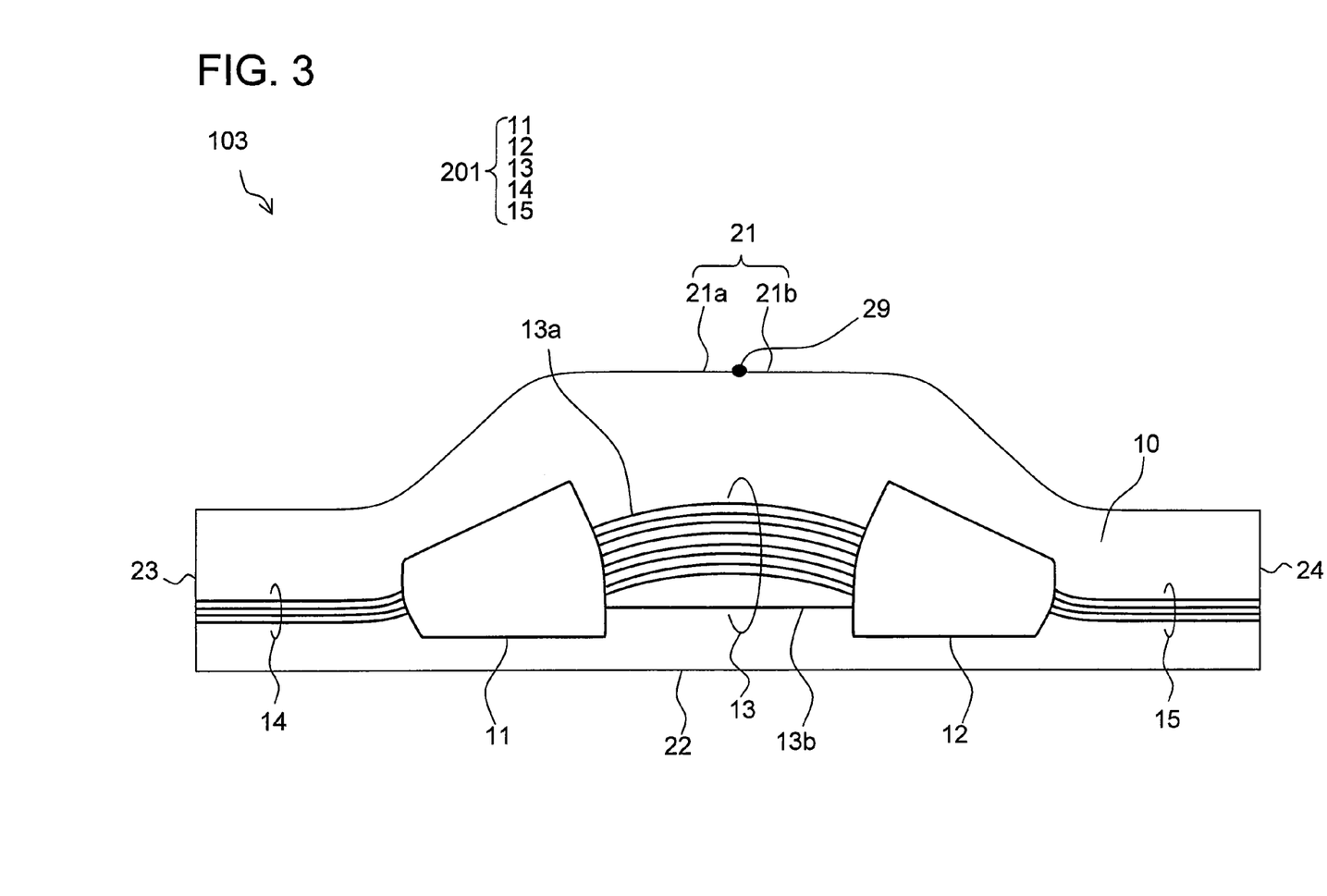
FIG. 3 is a diagram illustrating the configuration of an optical chip 103 in another embodiment according to the present application.

FIG. 3 is a diagram illustrating the configuration of an optical chip 103 exemplifying another embodiment according to the present application. The same reference numerals in FIG. 3 as those used in FIG. 1 designate the same component parts or portions. The optical chip 103 is different from the optical chip 101 illustrated in FIG. 1 in that the optical chip 103 further includes a channel waveguide 13b.

The channel waveguide 13b is one of the channel waveguides constituting an array waveguide 13, and has the same structure as that of the channel waveguide 13a described in reference to FIG. 1 except that it is not curved and straight connects a slab waveguide 11 and another slab waveguide 12 to each other.

An AWG 201 in the optical chip 103 is operated in the same manner as the AWG 201 in the optical chip 101 illustrated in FIG. 1. Here, the AWG 201 includes the channel waveguide 13b, so that the AWG 201 in the optical chip 103 can more improve multiplexer/demultiplexer characteristics in comparison with the AWG 201 in the optical chip 101.

Moreover, since the optical chip 103 is identical in shape to the optical chip 101 illustrated in FIG. 1, it is hardly deformed, and therefore, the optical characteristics of the AWG 201 can be stabilized, like in the optical chip 101. Additionally, the optical chips 103 can be arranged without any gap, as described in reference to FIG. 2, thus enhancing the yield rate of the optical chips.

Thus, the optical chip 103 enhances the optical chip yield rate, and further, achieves the AGW excellent in optical characteristics.

(Further Example of Optical Chip for AWG)

Figure 4:
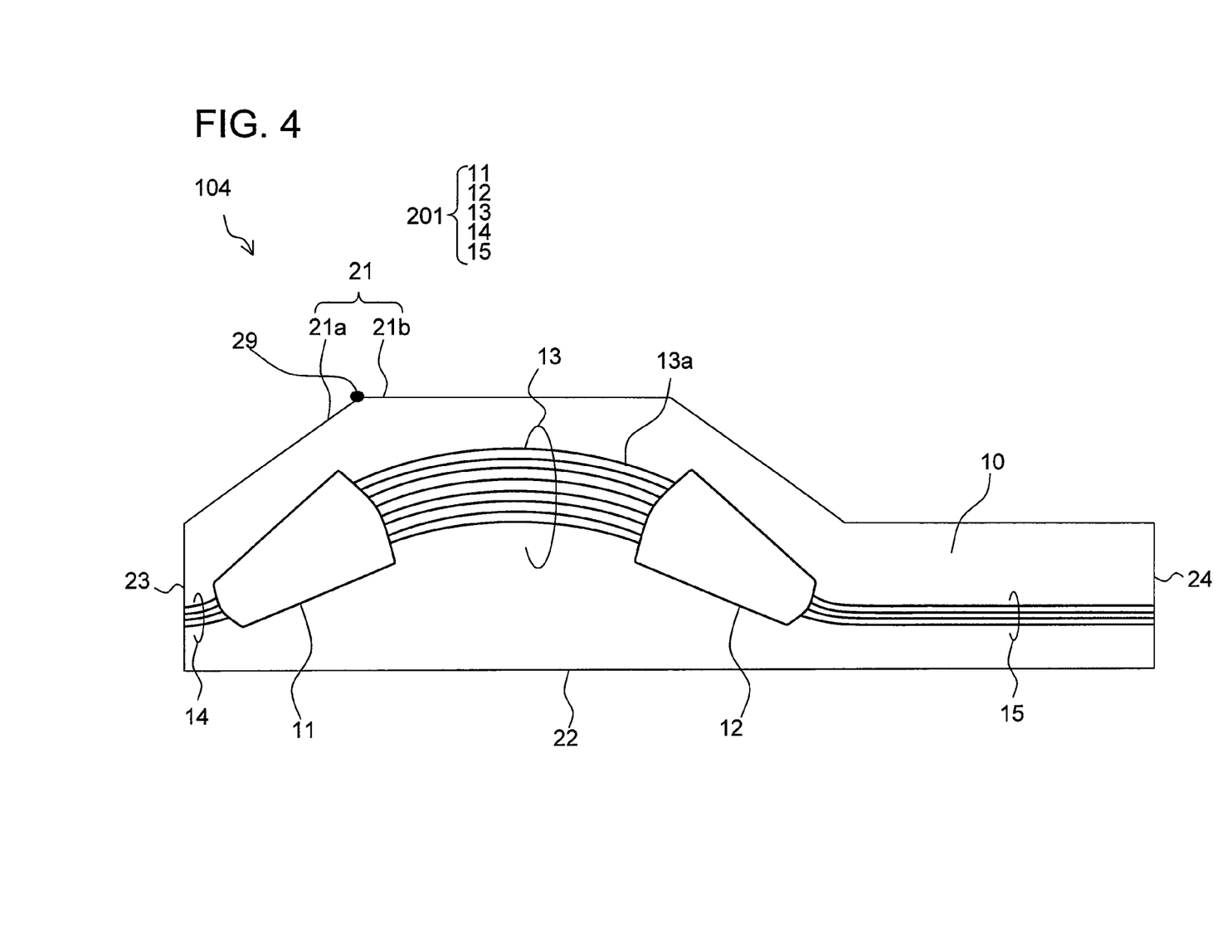
FIG. 4 is a diagram illustrating the shape of an optical chip 104.

FIG. 4 is a diagram illustrating a further example of the optical chip for an AGW. The optical chips 101 and 103 illustrated in FIGS. 1 and 3, respectively, are wide near the center of the chip. In contrast, an optical chip 104 illustrated in FIG. 4 may be wide near either of the input/output ends. The same reference numerals in FIG. 4 as those used in FIG. 1 designate the same component parts or portions. A first line 21a and a second line 21b of the optical chip 104 are defined not in curves but in straight lines, wherein they may be either curves or straight lines as long as they establish the relationship of two fold rotational symmetry.

An AWG 201 in the optical chip 104 is operated in the same manner as the AWG 201 in the optical chip 101 illustrated in FIG. 1. The optical chip 104 is wide near an array waveguide 13, so that it is hardly deformed, like in the optical chip 101 illustrated in FIG. 1, and therefore, the optical characteristics of the AWG 201 can be stabilized, like in the optical chip 101.

Figure 5:
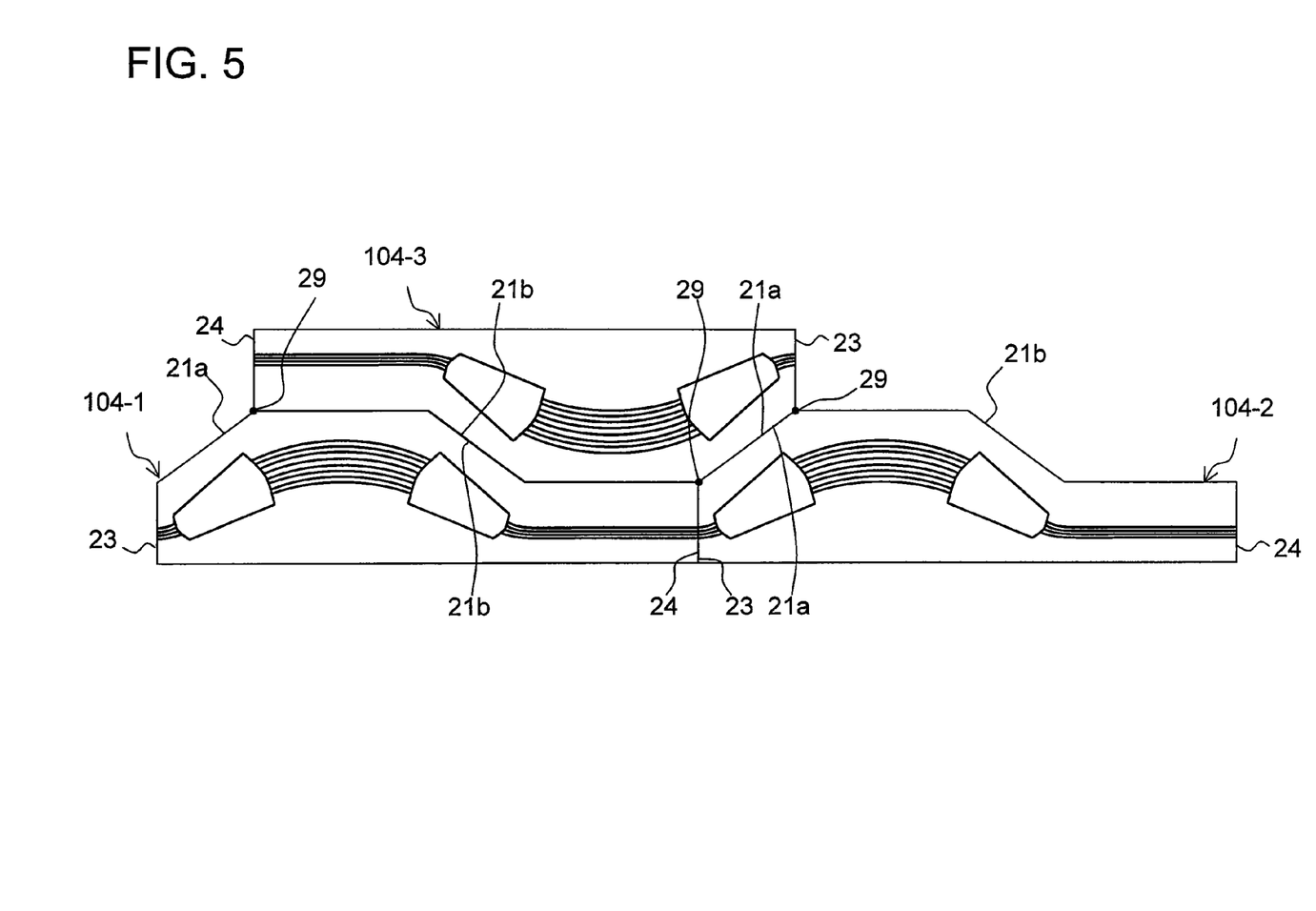
FIG. 5 is a diagram illustrating the arrangement of three optical chips 104.

The optical chips 104 can be arranged without any gap in combination with the optical chips 104 rotated at 180°, like the optical chips 101 illustrated in FIG. 2. FIG. 5 illustrates the arrangement of three optical chips 104. In FIG. 5, the same reference numerals as those used in FIGS. 1 and 4 designate the same component parts or portions. For the sake of explanation, the optical chips 104 are attached with branch numbers 1 to 3, and they all are identical to the optical chip 104 described in reference to FIG. 4.

Figure 8:
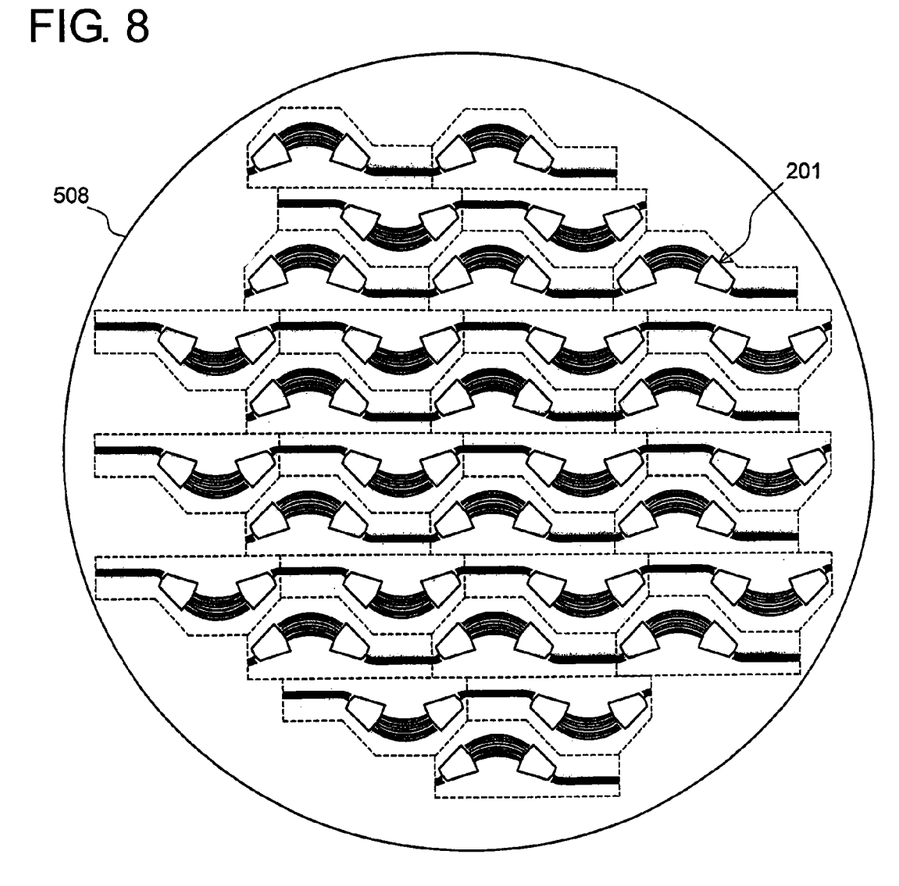
FIG. 8 is a diagram illustrating a silicon wafer 508 having the plurality of AWGs 201 arranged thereon. Broken lines indicate cut lines. The optical chips 104 can be cut out along the cutting lines, and therefore, the cutting lines indicate also a layout of the arrangement of the optical chips 104.

FIG. 8 illustrates a silicon wafer 508 serving as a waveguide substrate, on which the plurality of AWGs 201 is arranged. The same reference numerals in FIG. 8 as those used in FIGS. 1 and 4 designate the same component parts or portions. In addition, broken lines indicate cut lines, as illustrated in FIG. 7, and they show an outline of the optical chip 104 in FIG. 8. As described in reference to FIG. 7, the number of AWGs 201 to be formed on the silicon wafer 508 can be increased, thus enhancing the yield rate of the optical chip.

In this manner, the yield rate of the optical chip 104 can be enhanced, and further, the optical characteristics of the AWG 201 can be stabilized. Incidentally, the broken lines drawn in the silicon wafer 508 may disappear, as described with respect to the silicon wafer 507 illustrated in FIG. 7.

(Method for Fabricating Optical Chip for AWG)

The optical chip 101 illustrated in FIG. 1, the optical chip 103 illustrated in FIG. 3, and the optical chip 104 illustrated in FIG. 4 are fabricated through a forming process in which a pattern of the AWG is formed on a waveguide substrate and cutting processes in which the waveguide substrate is cut along the pattern of the AWG.

Specifically, a method for fabricating an optical chip for an arrayed waveguide grating type optical multiplexer/demultiplexer circuit includes: a circuit forming process for forming a waveguide substrate having a plurality of patterns for an arrayed waveguide grating type optical multiplexer/demultiplexer circuit formed thereon; a first cutting process for, after the circuit forming process, cutting the waveguide substrate in a line space on a side of a curve of an array waveguide out of line spaces defined between forward directions and reverse directions along a cut line consisting of a first line of two fold rotational symmetry and a second line of two fold rotational symmetry alternately connected to each other and out of contact with the arrayed waveguide grating type optical multiplexer/demultiplexer circuit while straight cutting the waveguide substrate in a line space on a side opposite to the curve of the array waveguide out of the line spaces defined between the forward directions and the reverse directions; and a second cutting process for cutting the forward directions and the reverse directions cut in the first cutting process in conformity with the patterns, to cut out the optical chip for the arrayed waveguide grating type optical multiplexer/demultiplexer circuit.

(1) Circuit Forming Process

In a circuit forming process is formed a silicon wafer having a plurality of patterns for AWGs formed thereon. Specifically, a waveguide substrate has thereon a plurality of patterns for arrayed waveguide grating type optical multiplexer/demultiplexer circuits including two slab waveguides, an array waveguide for connecting the slab waveguides via a plurality of channel waveguides different in optical path length and curved in one direction, and at least one or more input/output waveguides connected to the slab waveguides, respectively, on sides opposite to the array waveguide, wherein the AWGs are arranged in a layout in which a plurality of forward directions, on which the array waveguides are aligned in a curve direction and the patterns are aligned on one line in a direction perpendicular to the curve direction of the array waveguide, and a plurality of reverse directions, on which the curve direction of the array waveguide is aligned in a direction reverse to the curve direction of the array waveguide on the forward direction and the patterns are aligned on one line in the direction perpendicular to the curve direction of the array waveguide, are alternately arranged in such a manner that a center line vertically traversing between the slab waveguides on the side of the array waveguide on the forward direction traverses between the slab waveguides on the side of the input/output waveguide on the reverse direction, thereby forming a silicon wafer.

Figure 6:
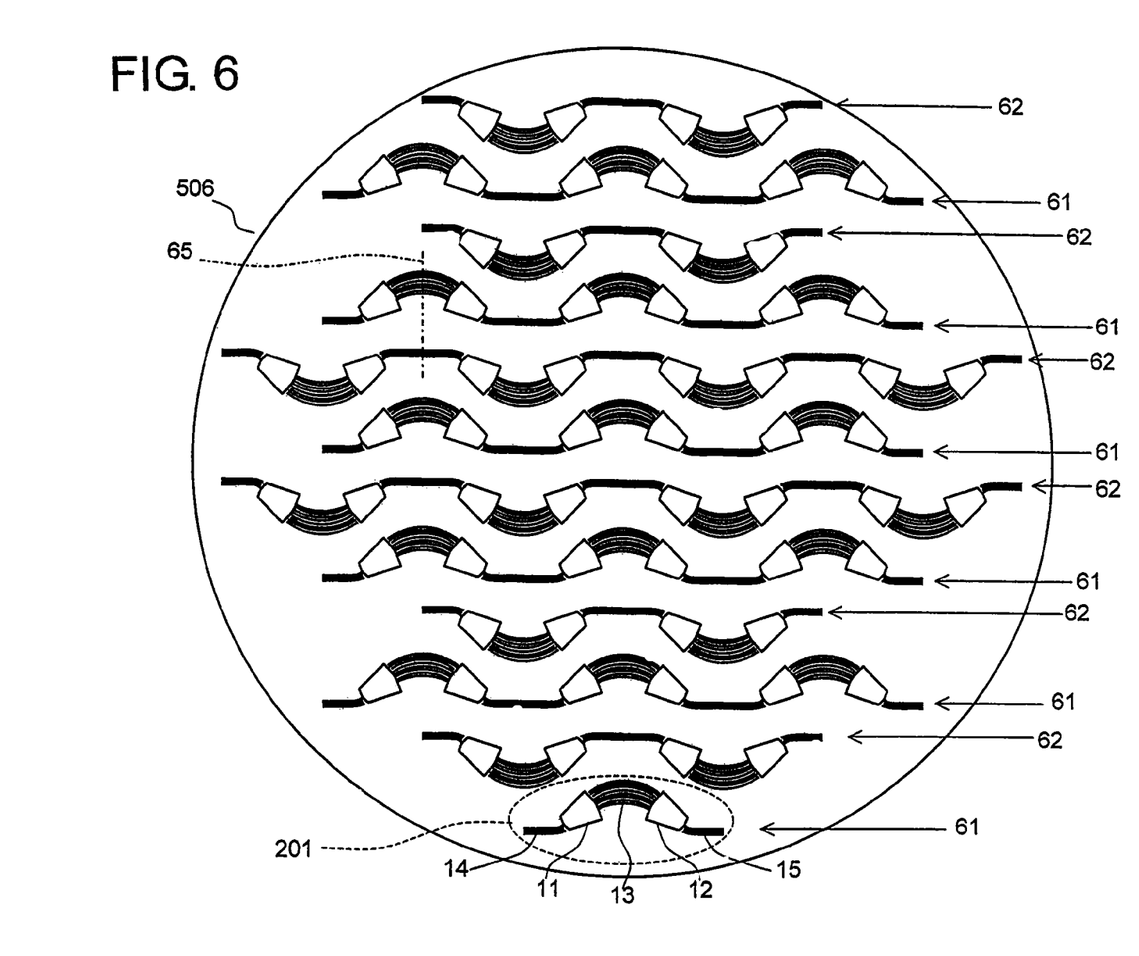
FIG. 6 is a diagram illustrating a silicon wafer 506 having a plurality of AWGs 201 arranged thereon.

A quartz thin layer is formed on the silicon wafer, and then doped with an element such as germanium according to the pattern of the AWG, thereby forming a waveguide. FIG. 6 is a diagram illustrating a silicon wafer 506 having the plurality of AWGs 201 arranged thereon. The same reference numerals in FIG. 6 as those used in FIG. 1 designate the same component parts or portions.

Reference numeral 61 designate a forward direction, on which the array waveguides 13 are aligned in a curve direction and the patterns of the AWGs 201 are aligned on one line in a direction perpendicular to the curve direction of the array waveguide 13. Furthermore, reference numeral 62 designate a reverse direction, on which the curve direction of the array waveguide 13 is aligned in a direction reverse to the curve direction of the array waveguide 13 on the forward direction 61 and the patterns of the AWGs 201 are aligned on one line in a direction perpendicular to the curve direction of the array waveguide 13. Although the input/output waveguides 14 and the input/output waveguides 15 in the adjacent AWGs 201 are brought into contact with each other on both of the forward direction 61 and the reverse direction 62 in FIG. 6, the AWGs 201 may be arranged without any contact.

The forward directions 61 and the reverse directions 62 are arranged in an alternate manner. Moreover, the forward directions 61 and the reverse directions 62 are arranged in such a manner that a center line 65 vertically traversing between the slab waveguide 11 and the slab waveguide 12 on the side of the array waveguide 13 on the forward direction 61 traverses between the slab waveguide 11 and the slab waveguide 12 on the side of the input/output waveguide 14 or the input/output waveguide 15 on the reverse direction 62.

Incidentally, the silicon wafer 506 is merely one example and another layout may be designed by combining the curve directions of the array waveguides, therefore, the drawing shall not limit the right. In addition, vertical and lateral directions may be inverted with respect to the silicon wafer.

In the layout of the silicon wafer 506, it is preferable that the forward direction is arranged in the space on the side of the curve of the array waveguide out of the spaces of the forward directions and the reverse directions in such a manner that a top of an outermost channel waveguide in the array waveguide included in the forward direction is located on the side of the input/output waveguide included in the reverse direction nearer than a line connecting tops of outermost channel waveguides in the array waveguide included in the reverse direction.

The forward direction 61 and the reverse direction 62 are arranged in such a manner that the array waveguide 13 on the forward direction 61 approaches the input/output waveguide 14 and the input/output waveguide 15 on the reverse direction 62, thus forming more patterns for the AWGs 201 on the silicon wafer 506.

(2) First Cutting Process and Second Cutting Process

In the cutting processes, the optical chips for the AWGs are cut out along the patterns of the AWGs formed on the silicon wafer. In the first cutting process, the line space between the AWGs is cut. In the second cutting process, the forward direction 61 and the reverse direction 62 cut in the first cutting process are cut out per AWG.

Explanation will be made below in reference to FIG. 6. In the first cutting process, the line space between the forward direction 61 and the reverse direction 62 on the silicon wafer 506 is cut. The line space located on a side opposite to the curve of the array waveguide 13 can be cut straight, and therefore, a dicing saw can be used.

In contrast, if the line space located on a side of the curve of the array waveguide 13 is cut straight, the dicing saw meets the array waveguide 13. As a consequence, the line space is cut along a curve or a bent straight line used as the cut line while bypassing the array waveguide 13. For example, the cut line may consist of the first lines of the two fold rotational symmetry and the second lines of the two fold rotational symmetry alternately connected to each other. In the case where it is difficult to use the dicing saw with respect to the cut line, the line space is cut by utilizing a water jet method by the use of a water pressure, a sand blast method, or a laser.

In the second cutting process, the forward direction 61 and the reverse direction 62 cut in the first cutting process are cut between the input/output waveguide 14 and the other input/output waveguide 15, thereby cutting out the optical chips including the AWGs 201. Here, the first cutting process and the second cutting process can be simultaneously performed in the case of the use of the water jet method, the sand blast method, or the laser mentioned above.

FIGS. 7 and 8 specifically show the cut lines as the broken lines. The same reference numerals in FIGS. 7 and 8 as those used in FIGS. 1, 4 and 6 designate the same component parts or portions. The optical chips 101 illustrated in FIG. 1 can be cut out along the cut lines illustrated in FIG. 7. On the other hand, the optical chips 104 illustrated in FIG. 4 can be cut out along the cut lines illustrated in FIG. 8.

Thus, the optical chip for the AWG, in which the optical chip yield rate is high and the optical characteristics are stable, can be fabricated according to the present method for fabricating the optical chip.

The shape of the optical chip, the waveguide substrate having the optical chips arranged thereon, and the optical chip fabricating method according to the present invention can be applied also to an optical chip including an optical circuit such as an add-drop circuit or an optical splitter circuit in addition to the optical chip including the AWGs therein.

The invention claimed is:

1. An optical chip for an arrayed waveguide grating type optical multiplexer/demultiplexer circuit comprising:
   a projecting shape expanded toward either side at a center;
   two slab waveguides;
   an array waveguide for connecting the slab waveguides via a plurality of channel waveguides different in optical path length and curved in one direction; and
   at least one input/output waveguides connected to the slab waveguides, respectively, on sides opposite to the array waveguide,
   wherein one edge is formed into a shape projecting outward of a curve of the array waveguide by connecting a first line of two fold rotational symmetry and a second line of two fold rotational symmetry whereas another edge facing the one edge is straight, and input/output ends, at which the input/output waveguides disposed at both ends appear, are equal in width to each other.

2. The optical chip for an arrayed waveguide grating type optical multiplexer/demultiplexer circuit according to claim 1, wherein the array waveguide further includes a straight channel waveguide having an optical path length shorter than those of the curved channel waveguides inward of the curves of the curved channel waveguides.

3. A waveguide substrate having a plurality of patterns for arrayed waveguide grating type optical multiplexer/demultiplexer circuits formed thereon comprising:
   two slab waveguides;
   an array waveguide for connecting the slab waveguides via a plurality of channel waveguides different in optical path length and curved in one direction; and at least one input/output waveguides connected to the slab waveguides, respectively, on sides opposite to the array waveguide, wherein the plurality of patterns for the arrayed waveguide grating type optical multiplexer/demultiplexer circuits are arranged in a layout in which a plurality of forward directions, on which the array waveguides are aligned in a curve direction and the patterns are aligned on one line in a direction perpendicular to the curve direction of the array waveguide, and a plurality of reverse directions, on which the curve direction of the array waveguide is aligned in a direction reverse to the curve direction of the array waveguide on the forward direction and the patterns are aligned on one line in the direction perpendicular to the curve direction of the array waveguide, are alternately arranged in such a manner that a center line vertically traversing between the slab waveguides on the side of the array waveguide on the forward direction traverses between the slab waveguides on the side of the input/output waveguide on the reverse direction, wherein in the layout, the forward direction is arranged in the space on the side of the curve of the array waveguide out of the spaces of the forward directions and the reverse directions in such a manner that a top of an outermost channel waveguide in the array waveguide included in the forward direction is located on the side of the input/output waveguide included in the reverse direction nearer than a line connecting tops of outermost channel waveguides in the array waveguide included in the reverse direction, wherein the layout has a zigzag cut line for cutting the waveguide substrate in a line space on a side of a curve of an array waveguide out of line spaces defined between forward directions and reverse directions, and a straight cut line for cutting the waveguide substrate in a line space on a side opposite to the curve of the array waveguide out of the line spaces defined between the forward directions and the reverse directions, and wherein the zigzag cut line consists of a first line of two fold rotational symmetry and a second line of two fold rotational symmetry alternately connected to each other and out of contact with the arrayed waveguide grating type optical multiplexer/demultiplexer circuit.

4. A method for fabricating an optical chip for an arrayed waveguide grating type optical multiplexer/demultiplexer circuit comprising:

a circuit forming process for forming a waveguide substrate having the plurality of patterns for the arrayed waveguide grating type optical multiplexer/demultiplexer circuit according to claim 3 formed thereon;

a first cutting process for, after the circuit forming process, cutting the waveguide substrate in a line space on a side of a curve of an array waveguide out of line spaces defined between forward directions and reverse directions along a cut line consisting of a first line of two fold rotational symmetry and a second line of two fold rotational symmetry alternately connected to each other and out of contact with the arrayed waveguide grating type optical multiplexer/demultiplexer circuit while straight cutting the waveguide substrate in a line space on a side opposite to the curve of the array waveguide out of the line spaces defined between the forward directions and the reverse directions; and a second cutting process for cutting the forward directions or the reverse directions cut in the first cutting process in conformity with the patterns, to cut out the optical chip for the arrayed waveguide grating type optical multiplexer/demultiplexer circuit, said optical chip comprising:

a projecting shape expanded toward either side at a center;

two slab waveguides;

an array waveguide for connecting the slab waveguides via a plurality of channel waveguides different in optical path length and curved in one direction; and at least one input/output waveguides connected to the slab waveguides, respectively, on sides opposite to the array waveguide, wherein one edge is formed into a shape projecting outward of a curve of the array waveguide by connecting a first line of two fold rotational symmetry and a second line of two fold rotational symmetry whereas another edge facing the one edge is straight, and input/output ends, at which the input/output waveguides disposed at both ends appear, are equal in width to each other.

* * * * *